(12) United States Patent
Wu et al.

(10) Patent No.: US 12,548,531 B2
(45) Date of Patent: Feb. 10, 2026

(54) CHOLESTERIC LIQUID CRYSTAL DISPLAY AND DRIVING METHOD OF CHOLESTERIC LIQUID CRYSTAL DISPLAY

(71) Applicant: IRIS OPTRONICS CO., LTD., Tainan (TW)

(72) Inventors: Chia-Che Wu, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/644,075

(22) Filed: Apr. 23, 2024

(65) Prior Publication Data
US 2024/0386861 A1   Nov. 21, 2024

(30) Foreign Application Priority Data
May 17, 2023   (TW) .................. 112118368

(51) Int. Cl.
*G09G 3/36* (2006.01)

(52) U.S. Cl.
CPC ... *G09G 3/3629* (2013.01); *G09G 2300/0486* (2013.01); *G09G 2310/067* (2013.01); *G09G 2320/0257* (2013.01)

(58) Field of Classification Search
CPC ..... G09G 2320/0257; G09G 2310/061; G09G 3/36; G09G 2320/0209; G09G 2300/0491; G09G 2300/0486; G09G 3/3648; G09G 2310/067; G09G 2310/0248; G09G 3/3629; G09G 3/3651
See application file for complete search history.

(56) References Cited

U.S. PATENT DOCUMENTS

| | | | |
|---|---|---|---|
| 2007/0097062 A1* | 5/2007 | Sawada ................ | G09G 3/3681 345/100 |
| 2009/0109247 A1* | 4/2009 | Kimura ................ | G09G 3/3666 345/690 |

* cited by examiner

*Primary Examiner* — Sanjiv D. Patel
(74) *Attorney, Agent, or Firm* — Cheng-Ju Chiang

(57) ABSTRACT

A driving method of cholesteric liquid crystal display is provided. A liquid crystal driving unit is used to output row driving voltage to multiple row circuit structures. Sequentially column driving voltage is outputted to multiple column circuit structures in a scanning manner. Scanning a column circuit structure takes one scanning time sequence. When starting the Nth time sequence of pixels to present the image, a ghost elimination voltage is applied to eliminate the image of the Mth time sequence and present it at the image position of the Nth time sequence, where M=N+1 and the ghost elimination voltage is applied at T. By doing so, the phenomenon of ghosts appearing on cholesteric liquid crystal displays can be improved, and the imaging quality of cholesteric liquid crystal displays can be improved.

10 Claims, 4 Drawing Sheets

CHOLESTERIC LIQUID CRYSTAL DISPLAY AND DRIVING METHOD OF CHOLESTERIC LIQUID CRYSTAL DISPLAY

BACKGROUND OF THE INVENTION

1. Field of the Invention

The present invention relates to the field of liquid crystal display technology, and in particular to a cholesteric liquid crystal display and a driving method thereof.

2. Description of Related Art

Cholesterol liquid crystal display (ChLCD) technology is a specific type of liquid crystal display. It utilizes cholesteric liquid crystals, which possess bistable characteristics. It means that cholesterol liquid crystals have two stable states without the need for an external force. The bistability is a key difference from the commonly used TFT LCD and OLED displays, which require a continuous external force to maintain their states.

Cholesterol liquid crystal molecules exhibit bistable characteristics, meaning they can maintain their arrangement without needing additional external energy. When a voltage is applied, the alignment of these cholesterol liquid crystal molecules can be controlled to switch between two stable states: a focal conic alignment state and a planar alignment state.

The driving method for cholesterol liquid crystal displays typically involves the Dynamic Driving Scheme (DDS). DDS utilizes the transition speed between the vertical arrangement state (Homeotropic state) and the suspended state (Transient Planar) of the cholesterol liquid crystals. The three-phase driving method is designed to address the hysteresis characteristics between the focal-conic state and the vertical alignment state. In this method, there are four main phases: Preparation phase, Selection phase, Evolution phase, and Non-Selection phase. During the Preparation phase, the cholesterol liquid crystals are converted into a vertically aligned state. The Selection phase results in either a dark state (focal-conic state) or a light state (planar state). To transition to the light state (planar state), the cholesterol liquid crystals remain in the vertical alignment state. To transition to the dark state (focal-conic state), they remain in the suspended state (transient planar). The Evolution phase utilizes the hysteresis between the vertical alignment state and the dark state (focal-conic state) to transition into a bright state (planar state) or a dark state (focal-conic state), achieving fast driving. The remaining time is spent in the Non-Selection phase.

In FIG. 2, the abscissa represents time, and from top to bottom are the columns, Nth scanning time sequence, N+1th scanning time sequence, and N+2th scanning time sequence. Each waveform in each phase in FIG. 2 is the same as those shown in FIG. 1. The inventor discovered that the current method of directly connecting the Selection phase signal of the N+1th scanning time sequence to the Selection phase signal of the Nth scanning time sequence leads to interference with the Evolution phase voltage of the Nth scanning time sequence during imaging. The interference causes the image from the Nth scanning time sequence to appear in the image presented in the N+1th scanning time sequence, which significantly impacts the image quality of the cholesterol liquid crystal display.

Therefore, the purpose of the present invention is to provide a cholesteric liquid crystal display and a driving method thereof to solve the aforementioned problems.

SUMMARY OF THE INVENTION

The object of the present invention is to provide a cholesteric liquid crystal display and a driving method thereof. This is achieved by introducing a ghost elimination voltage during the Selection phase of the Nth scanning time sequence and the Selection phase of the Mth scanning time sequence, with an application time of T. It eliminates the image of the Mth scanning time sequence that would otherwise appear at the image position of the Nth scanning time sequence. As a result, the liquid crystals of the Nth scanning time sequence can stabilize before the imaging process of the Mth scanning time sequence begins.

In order to achieve at least one of the aforementioned advantages or other advantages, an embodiment of the present invention provides a driving method for a cholesteric liquid crystal display. The method involves using a liquid crystal driving unit to output a row driving voltage to a corresponding row circuit structure. The liquid crystal driving unit also outputs a column driving voltage and sequentially outputs it to the corresponding column circuit structure in a scanning manner, with scanning of a column circuit structure requiring a scanning time sequence. When initiating the Nth scanning time sequence of the pixel to display the image, a ghost elimination voltage is applied to eliminate the image of the Mth scanning time sequence that would otherwise appear at the image position of the Nth scanning time sequence, where M=N+1. The application time of the ghost elimination voltage is denoted as T.

In certain embodiments, the scanning time sequence comprises a Preparation phase, a Selection phase, an Evolution phase, and a Non-Selection phase. The ghost elimination voltage is applied during the Selection phase of the Nth scanning time sequence.

In certain embodiments, the column driving voltage includes a Preparation phase, a Selection phase, an Evolution phase, and a Non-Selection phase based on the scanning sequence. The Nth scanning time sequence and the Mth scanning time sequence have a Selection phase of the same duration. The application time T is at least 10% of the duration of the Selection phase.

In certain embodiments, the application time T is 100% of the duration of the Selection phase.

In certain embodiments, a dynamically driven scanning time sequence is used to refresh the pixel presentation image.

In certain embodiments, the display includes a plurality of pixels arranged in a passive matrix configuration.

In order to achieve one or more of the aforementioned advantages or other advantages, an embodiment of the present invention provides a cholesteric liquid crystal display comprising a liquid crystal display panel and a liquid crystal driving unit. The liquid crystal display panel includes multiple pixels. The liquid crystal driving unit is electrically connected to the liquid crystal display panel and drives the pixels to display images. The liquid crystal driving unit outputs a row driving voltage to the corresponding row circuit structure and sequentially outputs a column driving voltage to the corresponding column circuit structure through scanning. When scanning a column circuit structure, a scanning time sequence is required. The liquid crystal driving unit initially activates the Nth scanning time sequence of the pixel to display the image. Subsequently, the liquid crystal driving unit applies a ghost elimination voltage to eliminate the image from the Mth scanning time sequence that would otherwise appear at the image position of the Nth scanning time sequence, where M=N+1. The duration of application of the ghost elimination voltage is denoted as T.

In certain embodiments, the column driving voltage undergoes a sequence of phases: Preparation, Selection, Evolution, and Non-Selection based on scanning time sequence. Both the Nth and Mth scanning time sequences have a Selection phase of the same duration. The application time T extends for at least 10% of the duration of the Selection phase.

In certain embodiments, the application time T extends for the full duration of the Selection phase.

In some embodiments, the liquid crystal driving unit refreshes the display image of the pixels using a dynamic driving scheme mode scanning time sequence.

In certain embodiments, multiple pixels are arranged in a passive matrix configuration.

The present invention provides a cholesteric liquid crystal display and its driving method. By applying a ghost elimination voltage in the Selection phase of the Nth scanning time sequence and the Selection phase of the Mth scanning time sequence, the image from the Mth scanning time sequence that would otherwise appear at the image position of the Nth scanning time sequence is eliminated. The duration of application of the ghost elimination voltage is denoted as T. The method of the present invention ensures that after the cholesteric liquid crystal is relatively stable in the Nth scanning time sequence, displaying the image of the Mth scanning time sequence begins, effectively improving ghost phenomenon on cholesterol liquid crystal displays and enhancing their image quality.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art.

The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
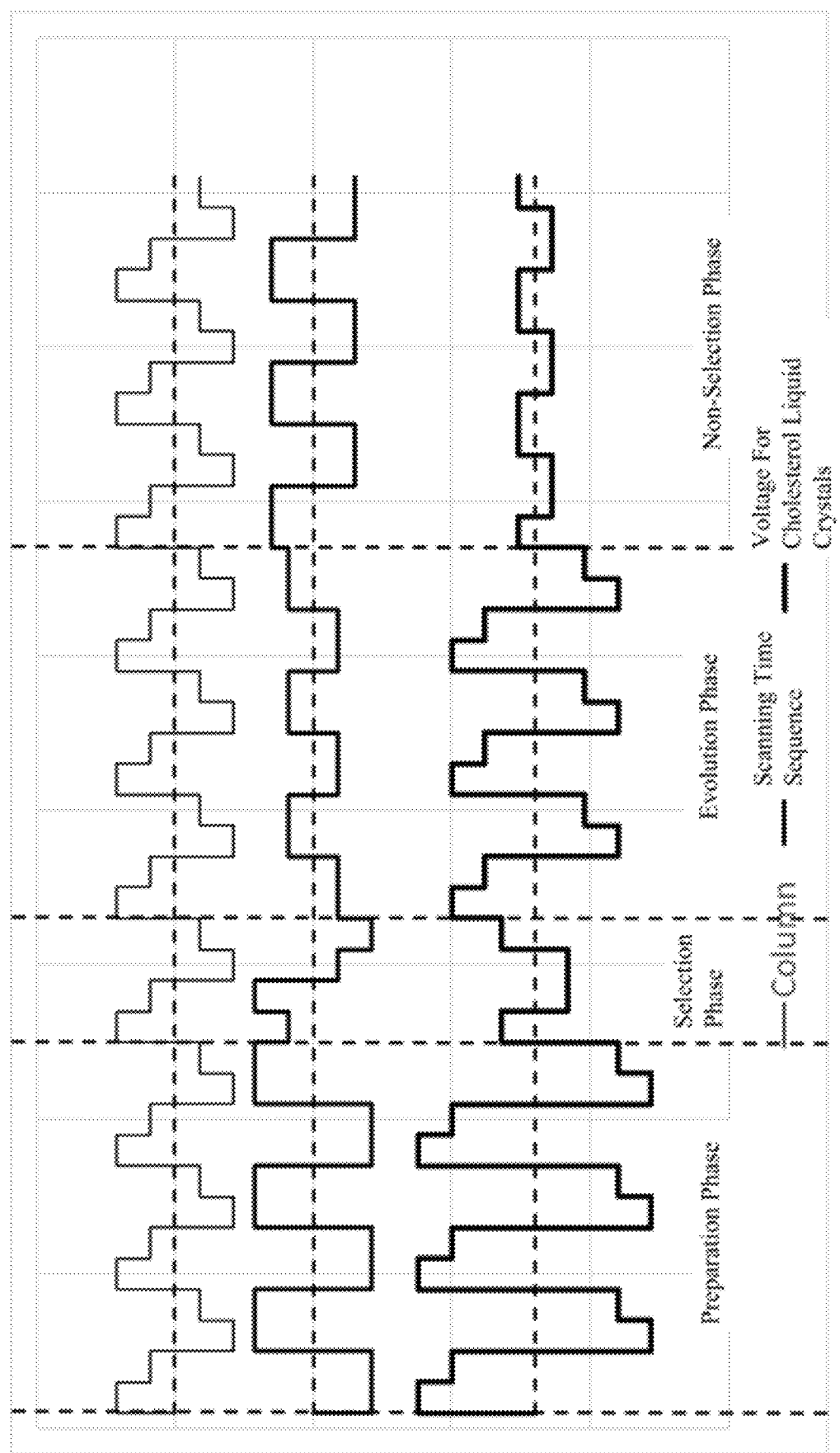
FIG. 1 is a schematic diagram of four phases of a cholesterol liquid crystal display operating in Dynamic Driving Scheme (DDS) mode.
Figure 2:
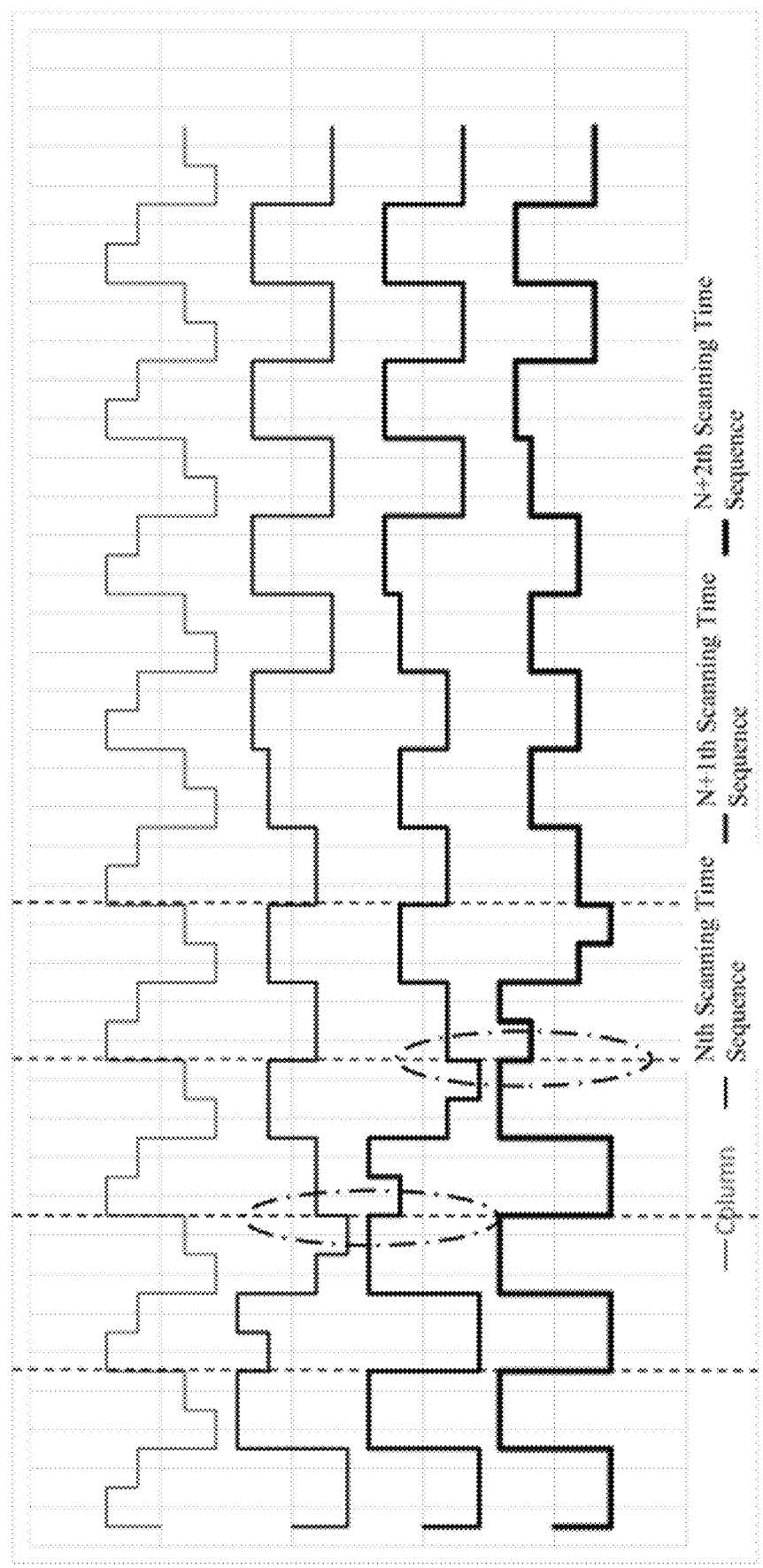
FIG. 2 is a schematic diagram of a scanning time sequence of a cholesterol liquid crystal display during operation.
Figure 3:
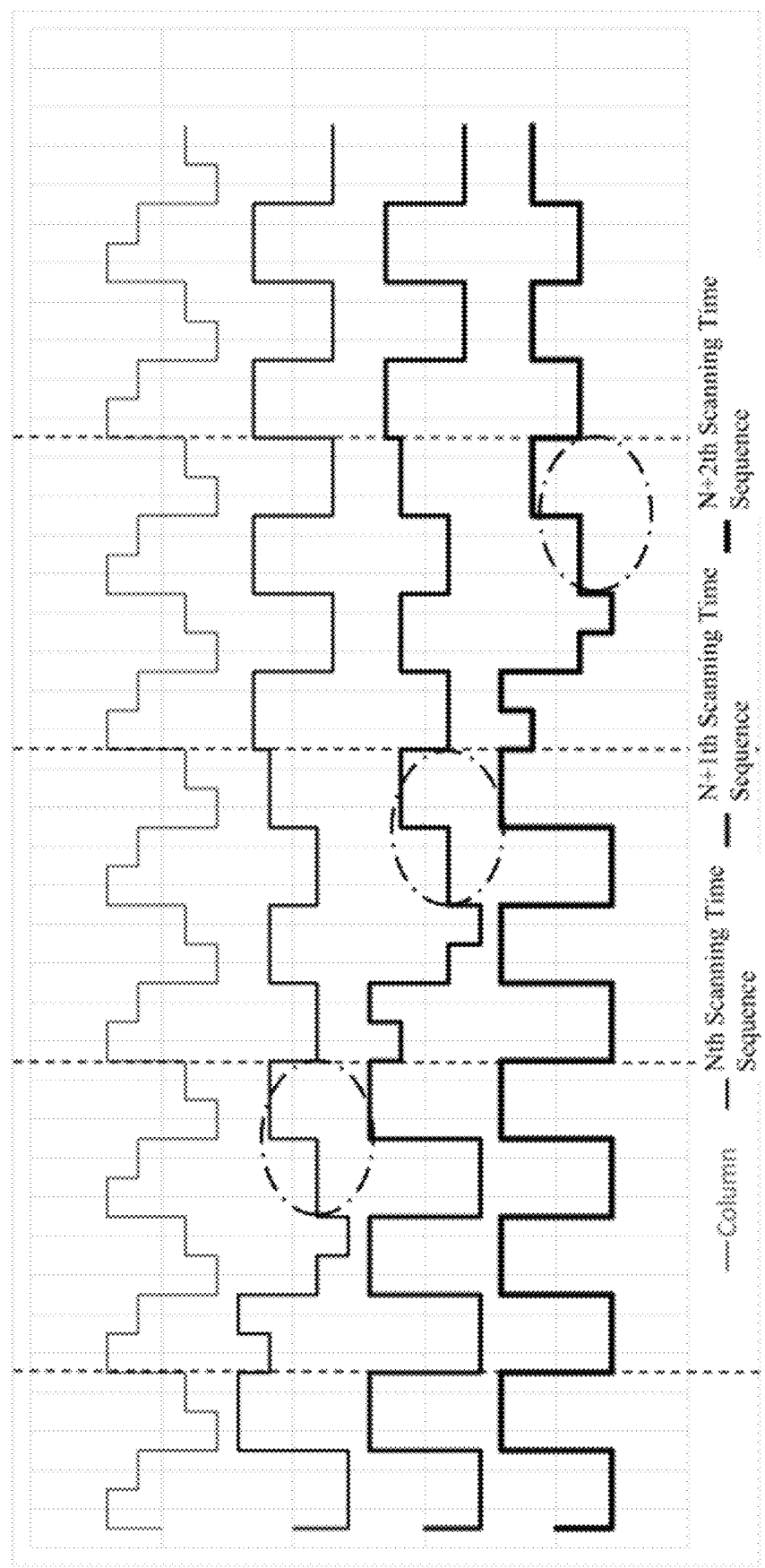
FIG. 3 is a schematic diagram of the scanning time sequence of the operation of the cholesteric liquid crystal display using the cholesteric liquid crystal display driving method according to the present invention after the Selection phase.

Please refer to FIG. 3 in conjunction with FIGS. 1 and 2. FIG. 3 is a schematic diagram of the scanning time sequence of a cholesteric liquid crystal display operating using the cholesteric liquid crystal display driving method of the present invention. The abscissa of FIG. 3 represents time. From top to bottom, they are Column, Nth scanning time sequence, N+1th scanning time sequence, and N+2th scanning time sequence. Each waveform in each phase in FIG. 3 is the same as those shown in FIG. 1.

In order to achieve at least one of the above advantages or other advantages, an embodiment of the present invention provides a driving method for a cholesteric liquid crystal display. The driving method includes the following steps:

In Step S1: the liquid crystal driving unit outputs a row driving voltage to the corresponding row circuit structure and sequentially outputs a column driving voltage to the corresponding column circuit structure in a scanning manner. Scanning a column circuit structure requires a scanning time sequence.

In Step S2, start the Nth scanning time sequence of the pixel to display the image.

In Step S3, apply a ghost elimination voltage for a duration of an application time T to eliminate the image of the Mth scanning time sequence that would otherwise appear at the image position of the Nth scanning time sequence, where M=N+1.

In FIG. 3, the abscissa represents time, and from top to bottom are Column, Nth scanning time, N+1th scanning time, N+2th scanning time. Each waveform in each phase is the same as those shown in FIG. 1. The N+1th scanning time sequence corresponds to the Mth scanning time sequence relative to the Nth scanning time sequence, and the N+2th scanning time sequence corresponds to the Mth scanning time sequence relative to the N+1th scanning time sequence. Both the displayed image based on the Nth scanning time sequence and the displayed image based on the Mth scanning time sequence have the same duration of the Selection phase. The ghost elimination voltage is increased and applied for a period of time T, where T is 100% of the duration of the Selection phase. The area circled in each scanning time sequence in FIG. 3 represents the ghost elimination time period, which can be understood by comparing FIGS. 2 and 3. By increasing the ghost elimination voltage and applying it for a period of time T, the liquid crystals in the Nth scanning time sequence can start displaying the image of the Mth scanning sequence after the cholesteric liquid crystal is relatively stable in the Nth scanning time sequence. In other words, during the Nth scanning time sequence, the voltage of the Evolution phase is not affected by the Selection phase of the next scanning time sequence (N+1th scanning time sequence), even though the data of the N+1th scanning time sequence no longer affect the image quality of the Nth scanning time sequence. The imaging in the Evolution phase is crucial, so effectively improving the ghost phenomenon on a cholesteric liquid crystal display can enhance the image quality of the display.

In some embodiments, the increased ghost elimination voltage is applied for a duration of application time T that is at least 10% of the duration of the Selection phase. Preferably, the application time T is 100% of the duration of the Selection phase. Additionally, the application time T should not exceed 300% of the duration of the Selection phase. The increased ghost elimination voltage can applied ranging from the Evolution phase to the Preparation phase.

In some embodiments, a dynamically driven scheme (DDS) scanning time sequence is used to refresh display image of the pixel.

In certain embodiments, the display includes a plurality of pixels arranged in a passive matrix configuration.

Figure 4:
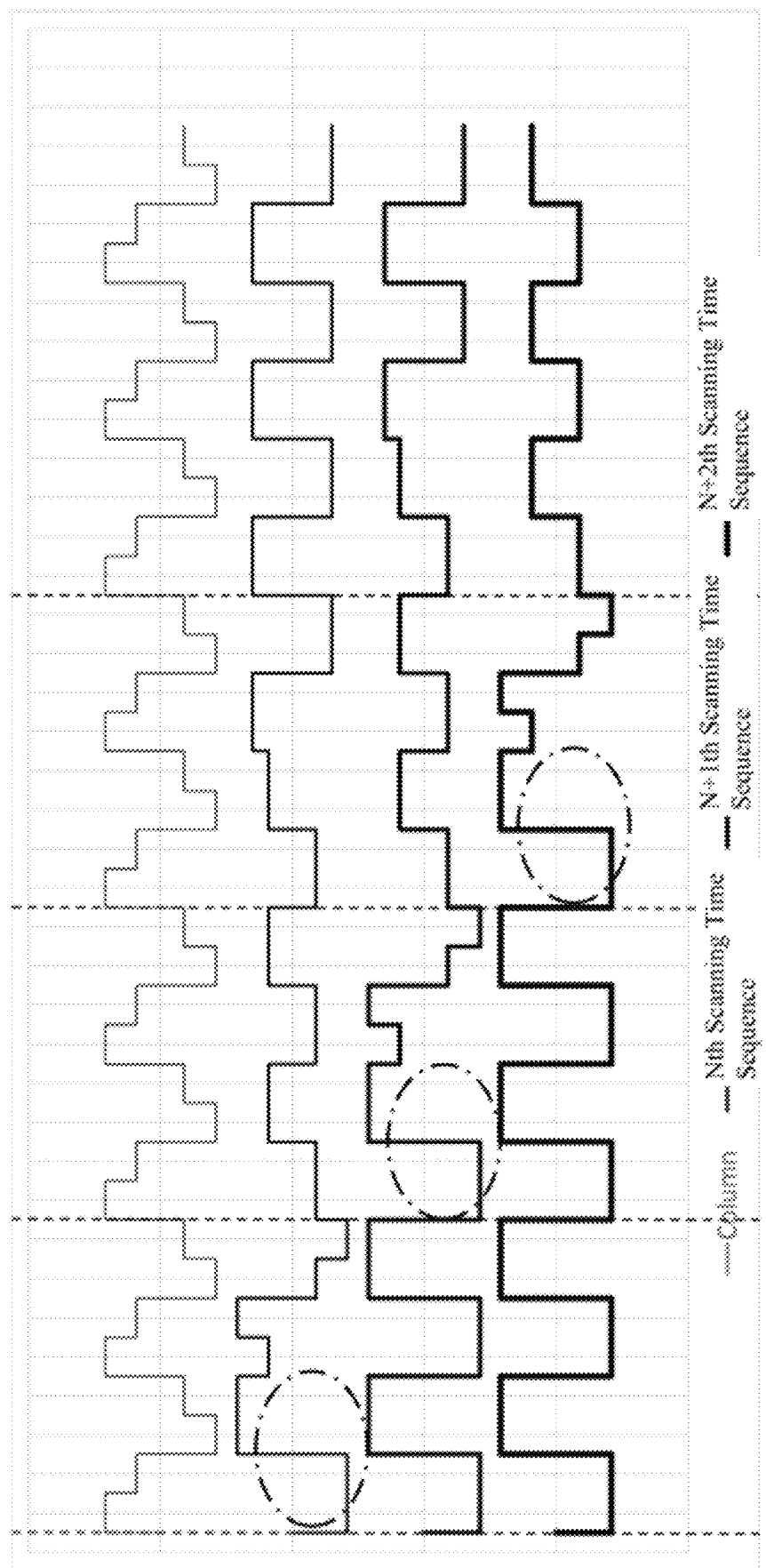
FIG. 4 is a schematic diagram of the scanning time sequence of the operation of the cholesteric liquid crystal display using the cholesteric liquid crystal display driving method according to the present invention before the Selection phase.

In addition, the ghost elimination voltage can be inserted before or after the Selection phase. The insertion can effectively improve the ghosting phenomenon on the cholesterol liquid crystal display and enhance its image quality. As shown in FIG. 4, the ghost elimination voltage is applied before the Selection phase starts, as depicted in the scanning time sequence diagram of the cholesterol liquid crystal display operation.

An embodiment of the present invention provides a cholesteric liquid crystal display comprising a liquid crystal display panel and a liquid crystal driving unit. The liquid crystal display panel comprises multiple pixels, while the liquid crystal driving unit is connected electrically to the liquid crystal display panel. It drives the pixels on the liquid crystal display panel to display images. The liquid crystal driving unit outputs a row driving voltage to the corresponding row circuit structure and sequentially outputs a column driving voltage to the corresponding column circuit structure in a scanning manner. Scanning a column circuit structure requires a scan sequence. Initially, the liquid crystal driving unit activates the Nth scanning time sequence of the pixel to display an image. Subsequently, the liquid crystal driving unit applies a ghost elimination voltage to eliminate the image of the Mth scan timing sequence that would otherwise appear at the image position of the Nth scan timing sequence, where M=N+1. The application time of the ghost elimination voltage is denoted as T.

In some embodiments, the column driving voltage includes a Preparation phase, a Selection phase, an Evolution phase, and a Non-Selection phase according to the scanning time sequence. The Nth scanning time sequence and the Mth scanning time sequence have the same duration for the Selection phase. The application time T is at least 10% of the duration of the Selection phase.

In some embodiments, the increased ghost elimination voltage is applied for a time T that is 100% of the duration of the Selection phase.

In some embodiments, the liquid crystal driving unit refreshes the displayed image of the pixels using a dynamic driving mode scanning scheme.

In certain embodiments, the display includes a plurality of pixels arranged in a passive matrix configuration.

The present invention provides a cholesteric liquid crystal display and its driving method by applying a ghost elimination voltage in the Nth Selection stage of the scanning time sequence and the Mth Selection phase of the scanning time sequence. The duration of application of the ghost elimination voltage, denoted as T, is used to eliminate the image from the Mth scanning time sequence that would otherwise appear at the image position of the Nth scanning time sequence. The present invention ensures that after the cholesteric liquid crystal is relatively stable in the Nth scanning time sequence, displaying the image of the Mth scanning time sequence begins, effectively improving ghosting phenomena on cholesterol liquid crystal displays and enhancing their image quality.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A driving method for a cholesteric liquid crystal display, the method comprising:
    using a liquid crystal driving unit to output a row driving voltage to a corresponding row circuit structure and sequentially output a column driving voltage to the corresponding column circuit structure among a plurality of column circuit structures in a scanning manner, wherein scanning each of the column circuit structure requires a scanning time sequence; and
    applying a ghost elimination voltage to eliminate an image of an Mth scanning time sequence that appears at the image position of an Nth scanning time sequence, wherein the Mth scanning sequence corresponds to one of the column circuit structure, the Nth scanning sequence corresponds to another of the column circuit structure, where M=N+1, when the Nth scanning time sequence of the pixel begins to display the image, wherein an application time of the ghost elimination voltage is T, wherein the scanning time sequence comprises a Preparation phase, a Selection phase, an Evolution phase, and a Non-Selection phase, and the ghost elimination voltage is inserted before or after the Selection phase.

2. The driving method according to claim 1, wherein the Nth scanning time sequence and the Mth scanning time sequence have a Selection phase of the same duration, and the application time T is at least 10% of the duration of the Selection phase.

3. The driving method according to claim 1, wherein the application time T is 100% of the duration of the Selection phase.

4. The driving method according to claim 1, wherein a dynamically driven scanning time sequence is used to refresh the displayed image of pixel.

5. The driving method according to claim 1, wherein the multiple pixels are arranged in a passive matrix configuration.

6. A cholesteric liquid crystal display, comprising:
a liquid crystal display panel, comprising multiple pixels; and
a liquid crystal driving unit, electrically connected to the liquid crystal display panel and driving the pixels to display images, and wherein the liquid crystal driving unit outputs a row driving voltage to the corresponding row circuit and sequentially outputs a column driving voltage to the corresponding column circuit structure among a plurality of column circuit structures in a scanning manner, wherein scanning each of the column circuit structures requires a scanning time sequence;
wherein the liquid crystal driving unit initially activates an Nth scanning time sequence of the pixel to display an image, and subsequently the liquid crystal driving unit applies a ghost elimination voltage to eliminate an image of an Mth scanning time sequence that appears at the image position of the Nth scanning time sequence, wherein the Mth scanning time sequence corresponds to one of the column circuit structure, the Nth scanning time sequence corresponds to another of the column circuit structure, where M=N+1, and the duration of application of the ghost elimination voltage is T, and the scanning time sequence comprises a Preparation phase, a Selection phase, an Evolution phase, and a Non-Selection phase, and the ghost elimination voltage is inserted before or after the Selection phase.

7. The cholesteric liquid crystal display according to claim 6, wherein the Nth scanning time sequence and the Mth scanning time sequence have a Selection phase of the same duration, and the application time T is at least 10% of the duration of the Selection phase.

8. The cholesteric liquid crystal display according to claim 6, wherein the application time T is 100% of the duration of the Selection phase.

9. The cholesteric liquid crystal display according to claim 6, wherein a dynamically driven scanning time sequence is used to refresh the displayed image of pixel.

10. The cholesteric liquid crystal display according to claim 6, wherein the multiple pixels are arranged in a passive matrix configuration.

* * * * *